Patented Aug. 28, 1945

2,383,517

UNITED STATES PATENT OFFICE 2,383,517

METHOD OF PRODUCING A SCENT FIXATIVE

Maurice Sandoz, Vevey la Tour, Switzerland, assignor to Burton T. Bush, Inc., New York, N. Y., a corporation of New Jersey No Drawing. Application September 16, 1943, Serial No. 502,633

6 Claims. (Cl. 260—107)

This invention relates to perfumes, and more particularly to scent fixatives and the method of producing the same.

It is well known that the odor of a scent (which has been isolated from plants and in concentrated form) does not last long because the scent evaporates rather quickly. Due to the quick evaporation, the odor is concentrated and intense and frequently will not be as sweet and flowery as in its native environment where it is given off continually and in infinitesimal quantities to the surrounding atmosphere. In perfumes, to reduce the volatility and to permit the odor to be given off in small quantities, certain substances known in the art as "fixatives" are used. Indol, musk and ambergris are the most commonly used fixatives. Both indol and musk have pungent odors and, when used as fixatives in perfume, mask the odor of the scent ingredient thereof. As a consequence, indol and musk are not employed as fixatives in perfumes of the highest grades. Ambergris is one of the best scent fixatives for the reason that, though it itself has a scent, nevertheless it harmonizes with the other constituents of the perfume and permits the scent of the perfume to predominate. However, ambergris, because of the war conditions, is not now readily available. Even when ambergris is available, it is expensive.

An object of this invention is to provide a new and novel scent fixative.

Another object of this invention is to provide a cheap, inexpensive and readily available scent fixative.

A specific object of the invention is to provide a perfume containing as a scent fixative the yellow waxy solid (M. P. 47° C.) oleo resin extracted from *Myrica asplenifolia*.

A further object of this invention is to provide a method of obtaining the scent fixative from *Myrica asplenifolia*.

Other and additional objects will become apparent from the following description.

The above objects are accomplished, in general, by incorporating in compositions containing a scent the yellow waxy solid (M. P. 47° C.) extracted from *Myrica asplenifolia*. The yellow waxy solid which constitutes the scent fixative is obtained by extracting the leafy portion of *Myrica asplenifolia* with a solvent, removing the solids from the resulting solution, and obtaining the waxy solid as a residue upon evaporation of the solvent from the said solution.

In the following example, which is intended to illustrate and not restrict the invention, there is set forth the preferred method of obtaining the fixative, and the proportions are by weight:

Example

A predetermined quantity of the leafy portion of *Myrica asplenifolia* obtained from the plant is treated with a like quantity of a solvent comprising ⅓ ligroin and ⅔ petroleum ether. The mass is permitted to stand for 5 days at room temperature, and thereafter the solids are separated from the solution, as by centrifuging or filtering. The resulting solution is subjected to a distilling operation whereby the solvent is evaporated and a yellow waxy solid remains as the residue. The solvent is recovered and may be re-used.

The yellow waxy solid has a melting point of 47° C., is soluble in ethyl alcohol, olive oil and peanut oil, difficultly soluble in mineral oils, insoluble in water, and has a pleasing scent. Since the extraction process will probably also extract the essential oil of the plant, the waxy solid may be termed an "oleo resin." When used in conjunction with a scent, it serves as a scent fixative, its scent harmonizes with the other constituents, and it permits the scent of the other constituents to predominate.

An illustrative example of a perfume containing the fixative is as follows:

| | Parts by weight |
|---|---|
| Alcohol | 969.0 |
| Lavender | 20.0 |
| Bergamot | 10.0 |
| Fixative | 1.0 |

The plant previously referred to as *Myrica aspenifolia* is also known as *Comptonia peregrina* and *Liquidambar peregrina* and grows abundantly without especial care. At certain seasons of the year, the plant has a sticky fruit and, when the leafy portion and the fruit are utilized in the process, a somewhat higher yield of the fixative is obtained than when the leaves without the fruit are used. The fruit of the plant alone, when extracted by the process hereinbefore described, gives the highest yield of the fixative, but the separation of the fruit from the other parts of the plant is relatively expensive and considerably increases the cost of the fixative.

As is apparent from the foregoing, it is not necessary to use the entire plant. When the leafy portion, with or without the fruit, is used, it is severed from the top of the stem and preferably without removing the root from the field so that the plant may leaf again at the appropriate season of the year.

The solvent which is employed in the process does not extract the chlorophyl from the leaves. This is highly important. If a solvent were used which would extract the chlorophyl, the extract which constitutes the fixative would be greenish in color and the fixative would not be suitable for use in the incorporation in perfumes, which generally vary in color from a light straw to a golden yellow. Ligroin, petroleum ether, acetone, or mixtures thereof, are illustrative examples of solvents which may be used in the extraction process. It is to be understood that the term "solvent" as used herein is intended to cover a single solvent or a plurality of solvents, such as a solvent mixture.

When it is desired to accelerate the extraction operation, the mass of leaves and the solvent may be agitated whereby the period of time to complete the extraction process may be substantially lessened. Heating of the mass to a temperature below the boiling point of the solvent will also accelerate the extraction period.

Though in the preferred example of a perfume containing the fixative the proportion of the latter is given as 1 part per 1000 parts of perfume, it will be understood that the invention is not restricted to such proportion, since the proportion can vary in accordance with the nature of the constituents of the perfume and the desired rate of volatility thereof, as will be apparent to a person skilled in the art.

By the use of this invention, there is provided an economical scent fixative that harmonizes with and does not mask the scent usually incorporated in perfumes. The process of obtaining the fixative is relatively simple and economical to practice.

Though the invention in its preferred embodiment relates to fixatives for scents in perfumes, it is to be understood that it is not restricted thereto, since it can be employed with various articles and compositions of matter containing scents.

Since it is obvious that various changes and modifications may be made in the above description without departing from the nature or spirit thereof, this invention is not restricted thereto except as set forth in the appended claims.

I claim:

1. A method of producing a scent fixative which comprises treating the leafy portion of *Myrica asplenifolia* with petroleum ether, separating the solids from the solution, and removing the petroleum ether from the solution to obtain the waxy substance extracted from said *Myrica asplenifolia*.

2. A method of producing a scent fixative which comprises treating the leafy portion of *Myrica asplenifolia* with a solvent, said solvent being selected from the class which consists of ligroin, petroleum ether and mixtures thereof, separating the solids from the solution, and removing the solvent from the solution to obtain the substance extracted from said *Myrica asplenifolia*.

3. A method of producing a scent fixative which comprises treating the leafy portion of *Myrica asplenifolia* with a solvent comprising 1 part of ligroin and 2 parts of petroleum ether, the parts being by weight, separating the solids from the solution, and distilling the solvent from the solution to obtain the substance extracted from said *Myrica asplenifolia*.

4. A method as defined in claim 1 wherein the fruit is also treated.

5. A method as defined in claim 2 wherein the fruit is also treated.

6. A method as defined in claim 3 wherein the fruit is also treated.

MAURICE SANDOZ.